United States Patent [19]

Häuser et al.

[11] Patent Number: 5,551,486
[45] Date of Patent: Sep. 3, 1996

[54] METHOD AND EQUIPMENT FOR FILING CASTING MOLDS WITH CASTING RESIN OR SIMILARLY CASTING-READY LIQUID MEDIA

[75] Inventors: Erhard Häuser, Schöffengrund; Hans-Joachim Steindorf, Sinn, both of Germany

[73] Assignee: Wilhelm Hedrich Vakuumanlagen GmbH & Co. KG, Ehringshauen-Katzenfurt, Germany

[21] Appl. No.: 212,163

[22] Filed: Mar. 14, 1994

[30] Foreign Application Priority Data

Mar. 14, 1993 [DE] Germany ............... 43 07 919.9
Mar. 18, 1993 [DE] Germany ............... 43 08 651.9
Jun. 4, 1993 [DE] Germany ............... 43 18 496.0

[51] Int. Cl.⁶ ............................................ B29C 39/24
[52] U.S. Cl. ................ 141/1; 141/94; 141/196; 264/328.4
[58] Field of Search ........................ 141/1, 9, 83, 94, 141/95, 105, 107, 196; 425/146–148; 264/328.4, 328.6

[56] References Cited

U.S. PATENT DOCUMENTS

| | | | |
|---|---|---|---|
| 3,820,928 | 6/1974 | Lemelson | 425/146 |
| 4,297,360 | 7/1981 | Hauser | 222/1 |
| 4,307,760 | 12/1981 | Hauser | 141/95 X |
| 4,565,511 | 1/1986 | Ramisch | 425/146 |
| 4,921,132 | 5/1990 | Wales et al. | 141/83 |
| 5,122,315 | 6/1992 | Darley | 425/148 X |
| 5,147,660 | 9/1992 | Steindorf | 425/148 |
| 5,148,841 | 9/1992 | Graffin | 141/83 |
| 5,156,193 | 10/1992 | Baruffato et al. | 141/1 |
| 5,187,001 | 2/1993 | Brew | 425/145 |
| 5,295,800 | 3/1994 | Nelson et al. | 425/146 X |

FOREIGN PATENT DOCUMENTS

| | | |
|---|---|---|
| 0478876 | 4/1992 | European Pat. Off. . |
| 2666272 | 3/1992 | France . |
| 4029193 | 5/1991 | Germany . |
| 2005589 | 4/1979 | United Kingdom . |

*Primary Examiner*—J. Casimer Jacyna
*Attorney, Agent, or Firm*—Longacre & White

[57] ABSTRACT

The present disclosure concerns a method and apparatus for filling casting molds with casting resin or similar casting ready liquid media using a feed system including pumps or a pressurized vessel. In order to carry out mold filling in a prep-programmed and precisely reproducible manner, regarding the filling rate, the casting resin is fed according to a predetermined filling function of the quantity of casting resin per unit time (filling rate).

17 Claims, 4 Drawing Sheets

METHOD AND EQUIPMENT FOR FILLING CASTING MOLDS WITH CASTING RESIN OR SIMILARLY CASTING-READY LIQUID MEDIA

BACKGROUND OF THE INVENTION

1. Field of the Invention

The invention concerns a method for filling casting molds with casting resin, or a similar casting-fluid liquid media, and the equipment with which to carry out the method.

2. Description of Related Art

When processing casting resins in pressure-molding, the casting resins are supplied either from pressurized vessels or by means of a multi-component metering and mixing apparatus to the particular casting molds.

When a pressurized vessel is used, the casting material, which is generally prepared under vacuum conditions, is transferred from a batch mixer into the pressurized vessel. Compressed air is used to move the casting material out of the pressurized vessel into the casting mold, as well as maintain the forming pressure.

As a rule, the pressurized vessel has adequate capacity for the number of molded articles which are cast sequentially at one time. Therefore, as the casting material ages during processing, correspondingly different viscosities result. To ensure constant quality when making the cast articles, constant filling rates of the subsequently manufactured cast articles are required. Because of the change in viscosity over time, the pressure must be constantly readjusted so that the rate of filling of the sequentially manufactured cast articles does not vary unduly.

Another drawback of pressurized vessels is that the previously vacuum-prepared casting material reacquires gases from the application of the compressed air.

European patent document 47 88 76 A1 describes a pressurized vessel in which the casting material is not directly exposed to compressed air. However, this design also has the disadvantage that quality differences arise among the cast articles on account of casting material aging. That is to say, when a substantial amount of time lapses between the initial and final casting from the same batch of casting material.

It is also known to use multi-component equipment such as that described in U.S. Pat. No. 4,307,760 to fill up casting molds with a continuous supply of casting material which does not contact air. However, the filling rate is kept constant only to the extent the viscosity of the material remains constant. This can be done only with difficulty, over an extended operating cycle.

The cast articles made by pressure-forming are most often used as insulators in electrical engineering and therefore the inclusion of even the tiniest air bubbles causes an unacceptable loss of quality and/or many articles to be rejected.

SUMMARY OF THE INVENTION

An object of the present invention is to carry out mold filling in a pre-programmed and precisely reproducible manner with respect to the filling rate (i.e. the flow of casting resin per unit time). In particular to satisfy the required filling conditions, especially regarding difficult-to-fill cast articles, regardless of the skills of an individual operator.

With respect to methodology, this problem is solved by feeding the casting resin to the casting mold according to a given filling function for the amount of casting resin per unit time (filling rate).

The flow of casting material at the casting mouth can be determined in relation to optimal need during each phase of mold filling. This information can be stored and later retrieved for reproducing a given filling function. The determination of the particular advantageous values as a rule is performed empirically for each mold. The filling amount per unit time, or flow, into a mold whether it be constant, increasing or decreasing, can be continuously determined and correspondingly summoned. The method of the invention makes it possible to take into account the various shaped spaces in each casting mold, thereby minimizing gas absorption of the prepared casting material during filling. Consequently, rejects are reduced, and product quality is both improved and made more uniform. The feed system may comprise either feed pumps, metering pumps or pressurized vessels, as well as a buffer in the form of a piston-cylinder system and also a system of buffer devices.

In a first embodiment of the invention, the flow of casting resin is constrained to a predetermined pattern, for instance the pattern of regular strokes established by a feed pump.

As an alternate to this predetermined feed system, the actual filling rate of casting resin may be ascertained and be readjusted in the event of deviation from a reference filling rate. A combination of constrained and regulated procedures is also conceivable.

In one procedure according to the present invention, the actual casting resin filling rate may be ascertained for instance by measuring the change in weight per unit time of a tank or pressurized vessel holding the casting resin. Illustratively, an electronic weighing scale may be used for such a purpose, determining the drop in weight of the tank or pressurized vessel dispensing the casting resin. The signals so obtained are transmitted to a control or regulation system.

One method according to the present invention for filling casting molds with casting resin or a similar casting-ready liquid media, uses a pump feed system followed by a buffer. The feed rate of the pump is divided into a predetermined filling rate for the casting mold and a storing rate for the buffer. The quantity of casting resin stored in the buffer is discharged to the casting mold during the pump suction stroke according to the predetermined filling rate until the new discharge stroke of the pump begins. As a result, a continuous volume-controlled filling flow is achieved, whereby extraordinary improvement with corresponding higher uniformity in product quality is obtained even as compared to metering systems. The volume of casting resin displaced by the pump stroke is discharged at precisely determined times, for instance by an in-line mixer, to the buffer which, according to the predetermined buffer discharge rate carries out a filling motion matched to the pump output, for instance by means of a positional drive. This is expressed by the equation:

$$\text{buffer storing rate} = \text{buffer feed rate} = \text{buffer discharge rate}.$$

During the suction stroke of the pump, the buffer discharges casting material at the reference value of the buffer discharge rate. The pump or pump system will again be discharging before the buffer is emptied, with storage of the casting material in the buffer taking place concurrently. As such, the volume of the discharge from the buffer may also be sufficient to fill a casting mold and cause pressure-forming. By means of these constrained, volumetric procedures of which the parameters can be programmed into and retrieved from a control means, stable flows are achieved even as the casting material moves between the buffer and the casting mold. Overall, cooperation between the pump and buffer are so well matched that the discharge rate of casting resin from the pump and the filling rate of the buffer provide precisely the required, instantaneous flow at the casting mouth of the casting mold and that the rate at which the buffer is emptied during pump suction precisely maintains the required instantaneous flow at the casting mouth.

In one implementation of the invention, the actual filling rate of the casting mold is determined by the motion of the buffer displacement component. This embodiment may be advantageous for instance when the storage volume of the buffer corresponds at least to the quantity of casting resin required to fill a casting mold. Whereby, following storing, the filling rate of the casting mold is determined in the desired manner solely by the motion of the displacement component of the buffer.

Moreover the invention proposes that the feed motion of the pump and the motions of the displacement component of the buffer take place as a function of the predetermined filling function. Generally, several pump output motions and buffer motions are required for modest buffer storing volumes or for substantial casting molds and must take place in coordinate sequences in order to obtain the predetermined filling function.

The invention furthermore provides that according to the control value of the filling rate, in-line flow control takes place downstream of the feed system or the buffer. Thereby the actual conditions at the casting mouth can be taken into account regardless of the presence of a pressurized vessel or a feed system such as a metering device with subsequent buffer.

In the event a pressurized vessel is used, the invention also makes it possible for the control value of the filling rate to act with respect to the magnitude of the fluid pressure in the pressurized vessel. This permits accurate adjustment of the flow per unit time at the casting mouth to satisfy the predetermined filling function.

According to the present invention, the operation of the pump and buffer are ganged at a preselected coupling ratio and, if called for during the filling procedure, a variable coupling ratio. The operation of the pump and buffer may be linked mechanically or electrically to each other in order to achieve the desired filling function at the casting mouth as a result of the mutually matched operations. Obviously, a multi-shaft track control also may be used to coordinate the operational motions of the pump and buffer. The drives for the pump and buffer may be in the form of shaft and/or positioning drives.

The invention also includes a regulator controlling the filling rate as a function of actual/reference comparison. Such a regulator takes into account the changing conditions of the overall equipment for instance when the flow impedance changes between the buffer and the casting mold, whereby the stroke power of the buffer or pump must be correspondingly increased or lowered. In the event there is a pressurized vessel, the control may also drive a regulator upstream of the flow regulator, so as to readjust the magnitude of the fluid pressure in the pressurized vessel.

Lastly, the invention discloses an apparatus to ascertain the flow of casting-ready liquid media such as casting resin. Specifically, a buffer cooperates with a displacement component moving away from the buffer due to an increase in feed flow and back toward it in the event of a decrease, as well as a device to ascertain the changes in time between the filling level(s). In the event the feed rate to the buffer is zero, for instance during the suction stroke of the feed pumps, the flow from the buffer is determined from the time-changes of the filling level in the buffer. If the feed rate at the buffer outlet is finite, then the flow at the buffer outlet when the feed rate is known is obtained from the time-changes of the storing volume in the buffer and from the direction of motion of the displacement component of the buffer.

Further objects, advantages and features and applications of the present invention are elucidated in the description below with respect to the illustrative embodiments shown in the drawings.

DESCRIPTION OF THE PREFERRED EMBODIMENT

Figure 1:
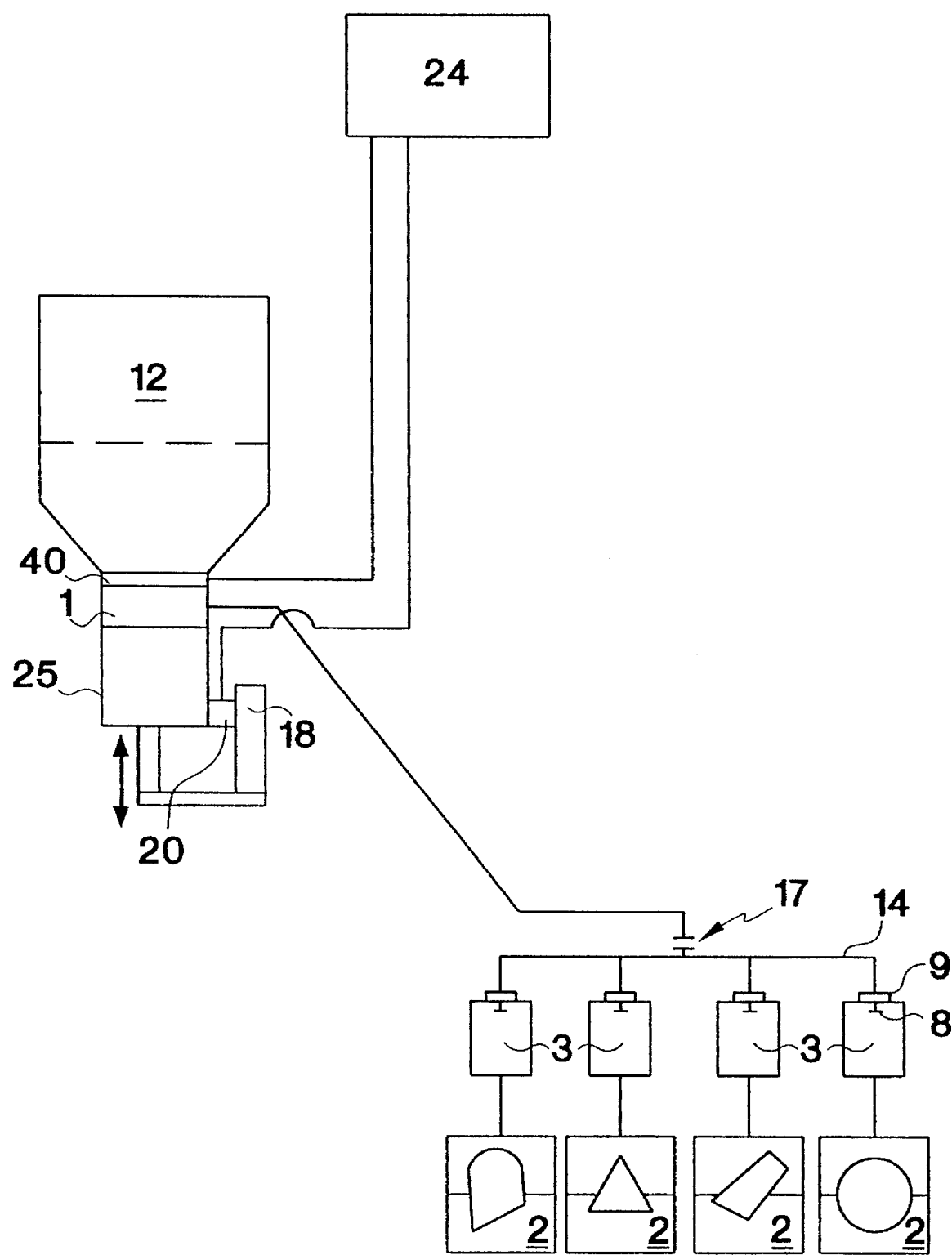
FIG. 1 is a mixing container with an external pump and a feed conduit.

FIG. 1 shows a mixing container 12 holding a casting-ready material which may consist of several mixed components. The mixing container 12 may be fitted with evacuation means. A pump 1 is connected to the mixing container 12 and moves the casting-ready material to the manifold conduit 14. A buffer 17 is located prior to the intake of the manifold conduit 14. A total of four buffer devices 3 are connected to the output of manifold conduit 14. The material to be cast flows from the buffer devices 3 into casting molds 2 which may hold different volumes.

Figure 2:
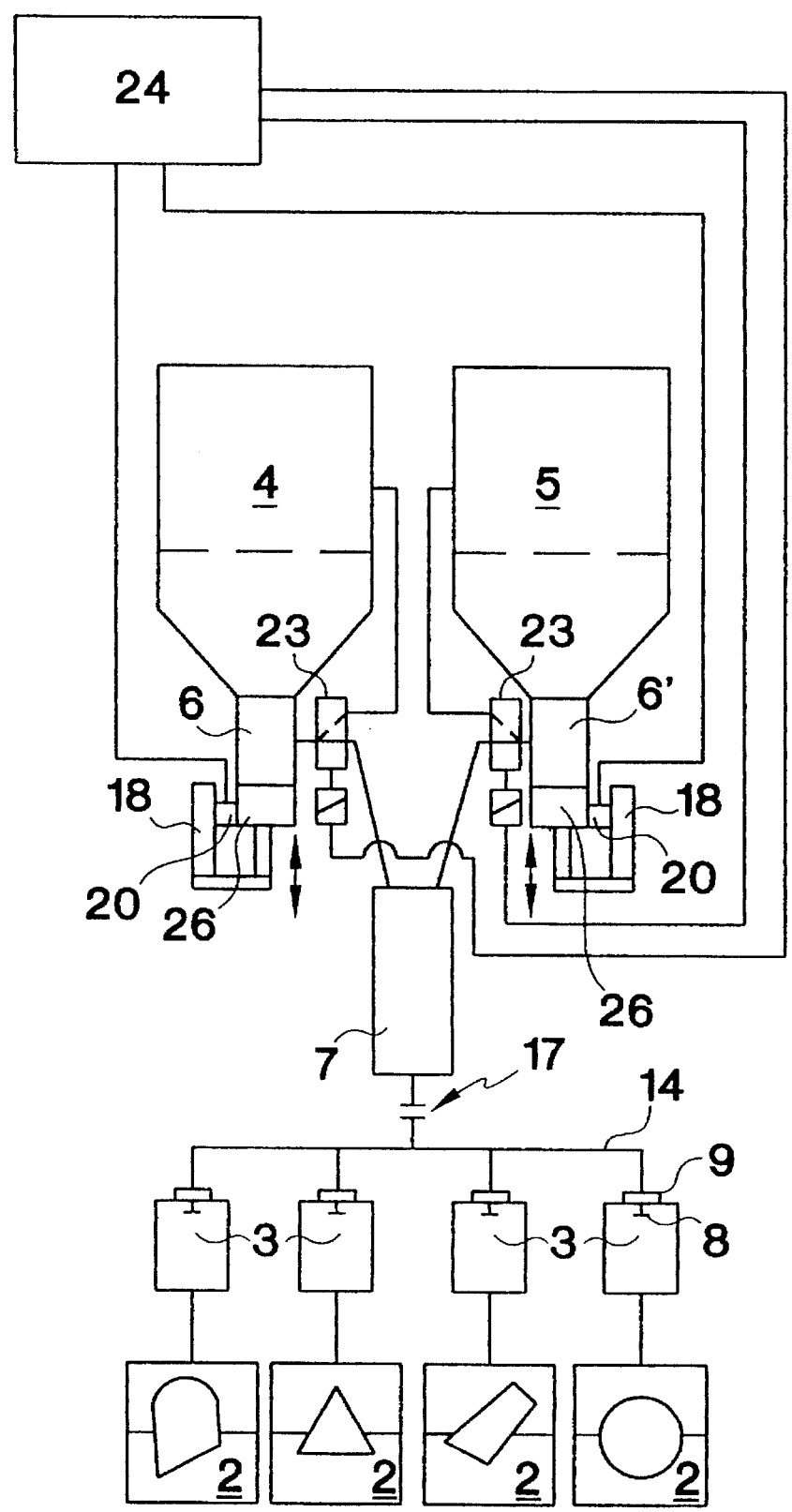
FIG. 2 is a setup with two tanks, feed means and casting mold.

FIG. 2 shows a setup with two tanks 4,5. Further tanks may also be provided. Metering pumps 6,6' are associated with each tank 4,5. The metering pumps 6,6' move the components from the tanks 4,5 into a mixing chamber 7 adjoined by the buffer 17. The presently reactive casting material passes from the buffer 17 into the manifold conduit 14 and from there into the buffer devices 3 which act to store pressure-materials. The significance and operation of these buffer devices 3 as fitted with an intake aperture 8, a valve 9, a plunger, an intake for pressurized media and control switches are comprehensively discussed in U.S. Pat. No. 4,307,760 and are not further elucidated herein.

In the embodiment of FIG. 1, the buffer 17 cooperates with the feed pump 1, and in the embodiment of FIG. 2 with the metering pumps 6,6', such that during discharge from the feed pump 1 or from the metering pumps 6,6', a desired partial flow moves at preselected or pre-computed speed to the individual buffer devices 3 from the buffer 17 through the manifold conduit 14, and from the individual buffer devices 3 to the casting molds 2, while the remainder of the flow is concurrently stored in the buffer 17. This remainder of casting resin will be emptied during the so-called suction stroke of the feed pump 1 or of the metering pumps 6, 6' at the desired, i.e. preselected or programmed rate, from the buffer 17 through the particular buffer device 3 into the corresponding casting molds 2, as a result of which a continuous, volumetrically controlled filling flow is generated.

A drive coupling is present between the feed pump 1 or the metering pumps 6,6' and the buffer 17. As a result the buffer 17 is driven in a synchronous suction motion during the output stroke of the feed pump 1, i.e. its plunger 21 shown in FIG. 3 being moved leftward. A central control system 24 is provided to couple the operational components 17 and 1 or 6,6' in a controlled manner. Positioning drives 19, 25, 26 present for the discharge motions of the pumps 1 or 6,6' and for the stroke of the buffer 17 are ganged to cooperate with the buffer drive 19 during the discharge stroke of the pump 1 or of the metering pumps 6,6'. A pickup 20 including a scale 18 resolves the stroke lengths into single pulses and transmits signals indicating changes in the stroke length and direction to the control system 24.

Shutoff valves 23 shown in FIG. 2 shut off the casting-resin feed system from the buffer 17 during the suction stroke of the pumps 6,6'; their operation is discussed in the German patent document 41 27 547 A1.

As an alternative to the embodiments shown in FIGS. 1 and 2, with their buffer 17 mounted upstream of the individual buffer devices 3, a buffer 17 may replace each buffer device 3 and at the same time may assume the buffering function during pressure forming, namely to maintain the forming pressure after filling and compensating for any voids in the molds 2.

Figure 3:
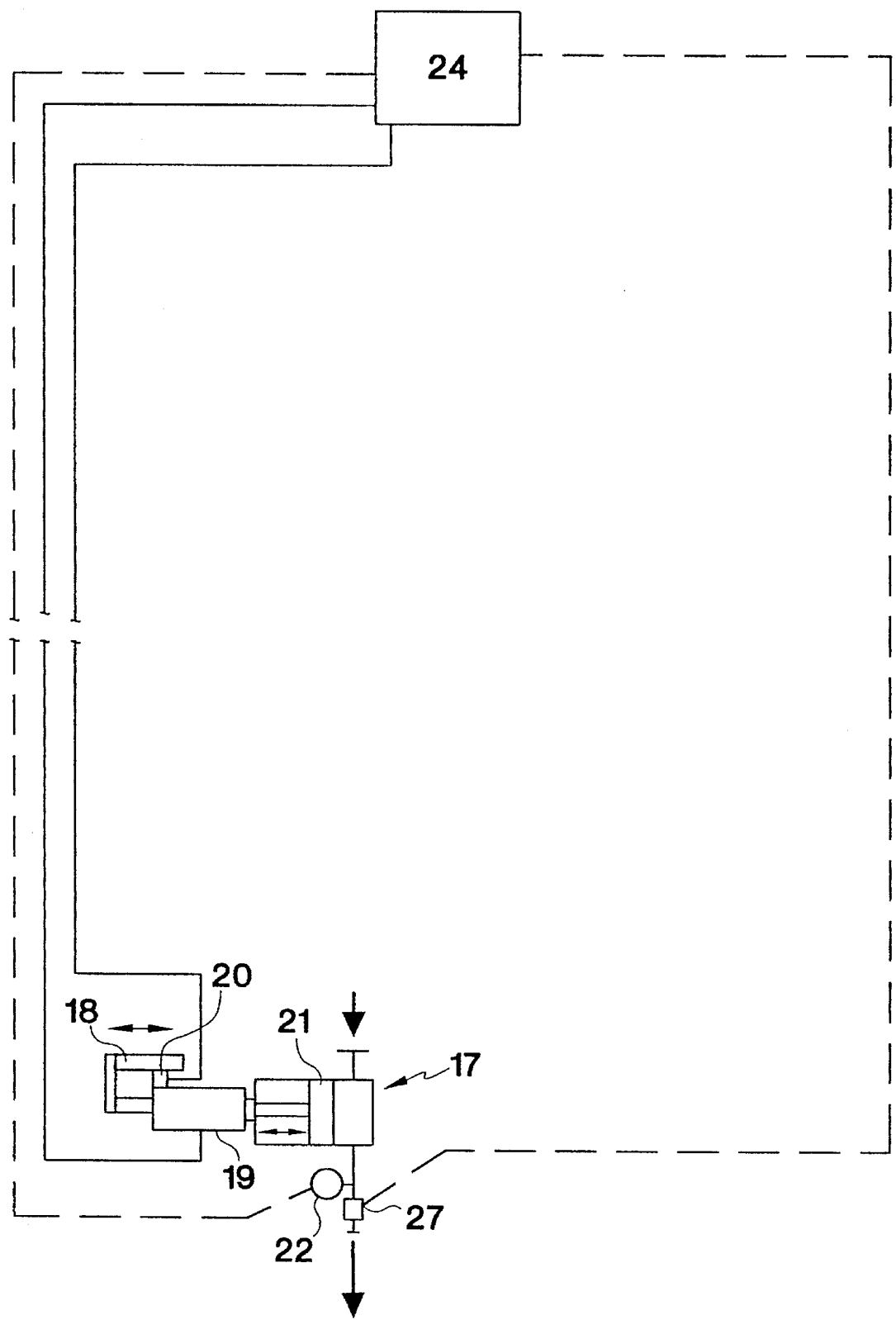
FIG. 3 is a buffer to fill the casting mold in a controlled manner.

As further shown in FIG. 3, a pressure sensor 22 may be present downstream of the buffer 17 to transmit the casting-mold filled state to the control system 24.

Where desired, a flow sensor 27 may be mounted in the casting material conduit 14 downstream of the buffer 17. The flow sensor 27 transmits a measured-value signal to the control system 24, whereby the servo-drive of the buffer 17 readjusts the flow automatically in relation to any discrepancy between measured and reference values. While this design requires a control linkage between the drives of the pumps 6,6' and the buffer 17, it is no longer necessary to gang the drives between the pumps 6,6' and the buffer 17.

Figure 5:
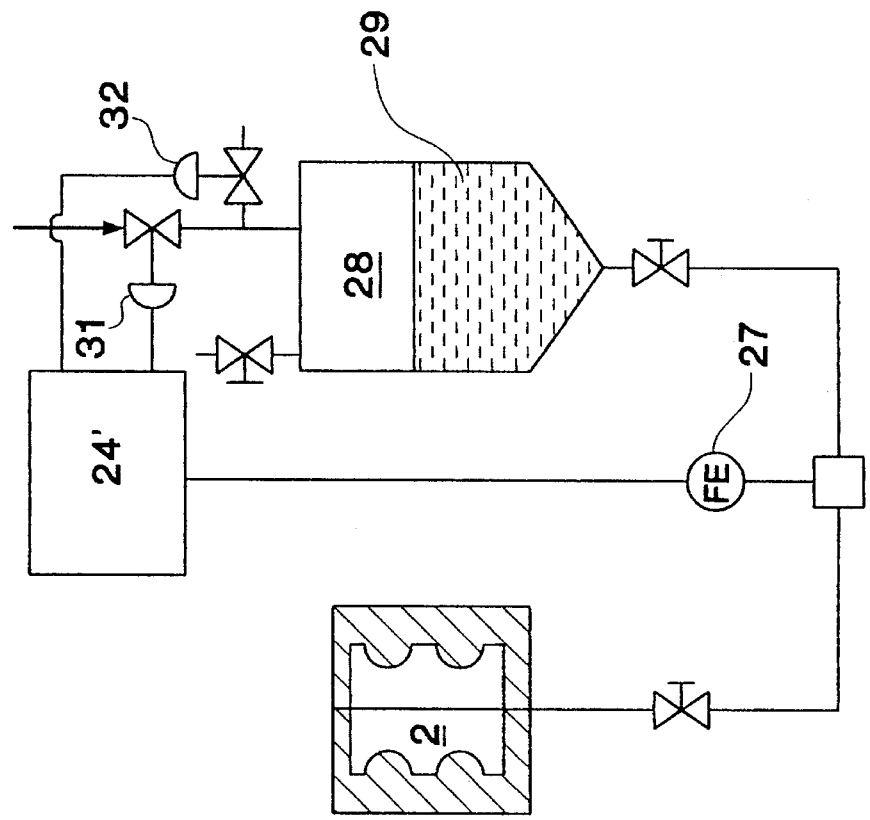
FIG. 5 is another way to fill a casting mold in a controlled manner using a pressurized vessel.
Figure 4:
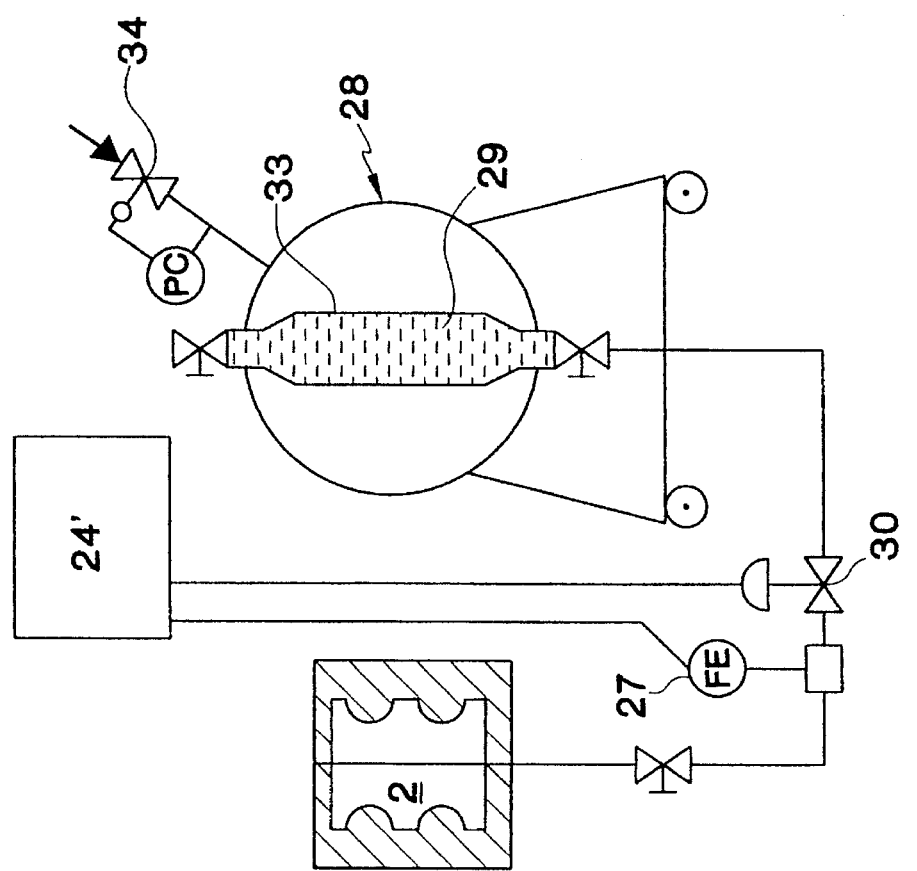
FIG. 4 is a pressurized vessel with a device controlling the filling of a casting mold.

As shown in FIGS. 4 and 5, reproducible casting of pressure forming molds 2 also can be achieved using a pressurizing vessel 28. In these embodiments, the actual casting-material flow is also ascertained and regulation or adjustment of the filling rate is implemented in relation to the deviation of the actual from the reference flow. In an alternative embodiment of the claimed invention, the casting rate may be ascertained by measuring the change in weight per unit of time of container 12. This is accomplished by an electronic weighing scale 40 which weighs the container 12 per unit of time and sends corresponding signals to the control regulation system 24.

A pressurized vessel 28, as described in the European patent document 47 88 76 A1, is shown in FIG. 4 and is connected by a control valve 30 and a flow sensor 27 to the casting mold 2. The control valve 30 is driven as a function of the deviation between actual and reference values of the flow by the regulator control 24'. A result of which is the flow cross-section in the material conduit is changed by the control valve 30. In this embodiment, constant pressure may be preset by means of a pressure control valve 34 in the pressurizing vessel 28. As further shown by FIG. 4, the casting material 29 is held within tubular container 33 and therefore is separated from the pressure medium.

With regard to the embodiment shown in FIG. 5, adjustment for the deviation of the casting-material flow from a predetermined reference value is implemented by regulating the control valves 31 and 32 for the pressure medium, which as a rule is compressed air.

What is claimed is:

1. A method for filling a casting mold with casting ready liquid media, said method comprising the steps of;

pumping said casting ready liquid media from a tank or pressurized vessel to a variable volume buffer leading to a casting mold, wherein the feed rate of said pump is divided into a predetermined filling rate for said casting mold and a storing rate for said buffer, the quantity of said casting ready liquid stored in said buffer is discharged to said casting mold during the pump suction stroke according to said predetermined filling rate until the new discharge stroke of said pump begins.

2. The method defined in claim 1, further comprising the steps;

ascertaining the actual flow of said casting ready liquid to the corresponding casting mold;

comparing said actual flow with the predetermined filling rate;

and adjusting said actual flow so as not to deviate from said predetermined filling rate.

3. The method defined in claim 2, further comprising the step;

ascertaining the actual flow of said casting mold by measuring the motion of the displacement component of said buffer.

4. The method as defined in claim 3, wherein suction and discharge cycles of said pump, as well as displacement of said buffer take place according to a predetermined filling profile for said casting ready liquid per unit time.

5. The method according to claim 4, wherein the buffer serves to maintain pressure in the mold during curing of the resin in the mold.

6. The method according to claim 5, further comprising the step that;

according to the control value of the filling rate, a quantity flow controller is actuated wherein said quantity flow controller is provided downstream of the feed system or the buffer.

7. The method according to claim 6, wherein in the event of a pressurized vessel the control value of the filling rate acts to the magnitude of the fluid pressure in the pressure vessel.

8. The method defined in claim 1, further comprising the step;

ascertaining the actual flow of said casting mold by measuring the motion of the displacement component of said buffer.

9. The method defined in claim 1 further comprising the step;

ascertaining the actual flow of said casting mold by measuring the motion of the displacement component of said buffer.

10. The method defined in claim 1, wherein said step of pumping comprises separately pumping individual casting components to a mixing chamber where said individual casting components are combined.

11. A method for providing continuous volume filling of a casting mold with a casting ready liquid media, said method comprising the steps of;

pumping said casting ready liquid media from a tank or pressurized vessel to a variable volume buffer and to a casting mold;

controlling the feed rate of said pump according a predetermined filling rate and a buffer storing rate, such that the pump discharge equals the amount of casting ready liquid entering the buffer plus the predetermined amount to be cast into said mold; and controlling said buffer such that the quantity of said casting ready liquid stored in said buffer is discharged to said casting mold during the pump suction according to said predetermined filling rate until the new discharge stroke of said pump begins, such that the molds are continuously filled at a constant volume rate.

12. The method defined in claim 11, further comprising the steps;

ascertaining the actual flow of said casting ready liquid to the corresponding casting mold;

comparing said actual flow with the predetermined filling rate; and adjusting the feed rate of said pump so as not to deviate from said predetermined filling rate.

13. The method defined in claim 12, further comprising the step;

ascertaining the actual flow of said casting mold by measuring the motion of the displacement component of said buffer.

14. The method as defined in claim 13, wherein suction and discharge cycles of said pump, as well as displacement of said buffer take place according to a predetermined filling profile for said casting ready liquid per unit time.

15. The method according to claim 14, wherein the buffer serves to maintain pressure in the mold during curling of the resin in the mold.

16. The method according to claim 15, wherein the control value of the filling rate acts according to the magnitude of the fluid pressure in the pressure vessel.

17. The method defined in claim 11, wherein said step of pumping comprises separately pumping individual casting components to a mixing chamber where said individual casting components are combined.

* * * * *

UNITED STATES PATENT AND TRADEMARK OFFICE
CERTIFICATE OF CORRECTION

PATENT NO. : 5,551,486
DATED : September 3, 1996
INVENTOR(S) : HÄUSER, ET AL.

It is certified that error appears in the above-identified patent and that said Letters Patent is hereby corrected as shown below:

column 2 between lines 55 and 60: change
"buffer storing rate=buffer feed rate=buffer discharge rate"
to
--buffer storage rate = pump feed rate - buffer outlet rate--.

Signed and Sealed this

Twenty-second Day of July, 1997

Attest:

Attesting Officer

BRUCE LEHMAN
Commissioner of Patents and Trademarks